(12) United States Patent
Madan et al.

(10) Patent No.: US 10,365,934 B1
(45) Date of Patent: Jul. 30, 2019

(54) DETERMINING AND REPORTING IMPAIRED CONDITIONS IN A MULTI-TENANT WEB SERVICES ENVIRONMENT

(71) Applicant: Amazon Technologies, Inc., Reno, NV (US)

(72) Inventors: Varun Madan, Western Cape (ZA); Martin Stephen van Tonder, Western Cape (ZA)

(73) Assignee: AMAZON TECHNOLOGIES, INC., Reno, NV (US)

( * ) Notice: Subject to any disclaimer, the term of this patent is extended or adjusted under 35 U.S.C. 154(b) by 15 days.

(21) Appl. No.: 14/027,670

(22) Filed: Sep. 16, 2013

(51) Int. Cl.
*G06F 9/455* (2018.01)

(52) U.S. Cl.
CPC .................. *G06F 9/455* (2013.01)

(58) Field of Classification Search
None
See application file for complete search history.

(56) References Cited

U.S. PATENT DOCUMENTS

| | | | |
|---|---|---|---|
| 8,738,972 B1* | 5/2014 | Bakman | G06F 11/00 714/47.1 |
| 2012/0030346 A1* | 2/2012 | Fukuda et al. | 709/224 |
| 2013/0185717 A1* | 7/2013 | Lakshminarayanan | 718/1 |
| 2014/0059395 A1* | 2/2014 | Mahindru | G06F 11/07 714/48 |
| 2014/0122941 A1* | 5/2014 | Pan et al. | 714/45 |

* cited by examiner

*Primary Examiner* — Bing Zhao
(74) *Attorney, Agent, or Firm* — BakerHostetler

(57) ABSTRACT

Techniques are disclosed for determining whether a computing node or a virtual machine instance executing on that computing node that is part of a web services platform is in an impaired condition or a normal condition. In embodiments, a status monitor of the web services platform obtains information about the status of the computing node or instance from multiple sources, aggregates this information to determine a cause of impairment and notifies a corresponding customer of this cause. In embodiments, the status monitor may also determine a possible remedy to this impairment and implement this remedy without customer input.

22 Claims, 7 Drawing Sheets

DETERMINING AND REPORTING IMPAIRED CONDITIONS IN A MULTI-TENANT WEB SERVICES ENVIRONMENT

BACKGROUND

There are web services platforms that provide compute resources to a plurality of customers. Multiple customers may access a web services platform via a computing node, and issue instructions to the web services platform. A web services platform may be called a multi-tenant web services platform to denote that multiple customers may access the platform. In turn, the web services platform may respond to these instructions by performing computing operations on one or more of a plurality of computing nodes that make up the web services platform.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
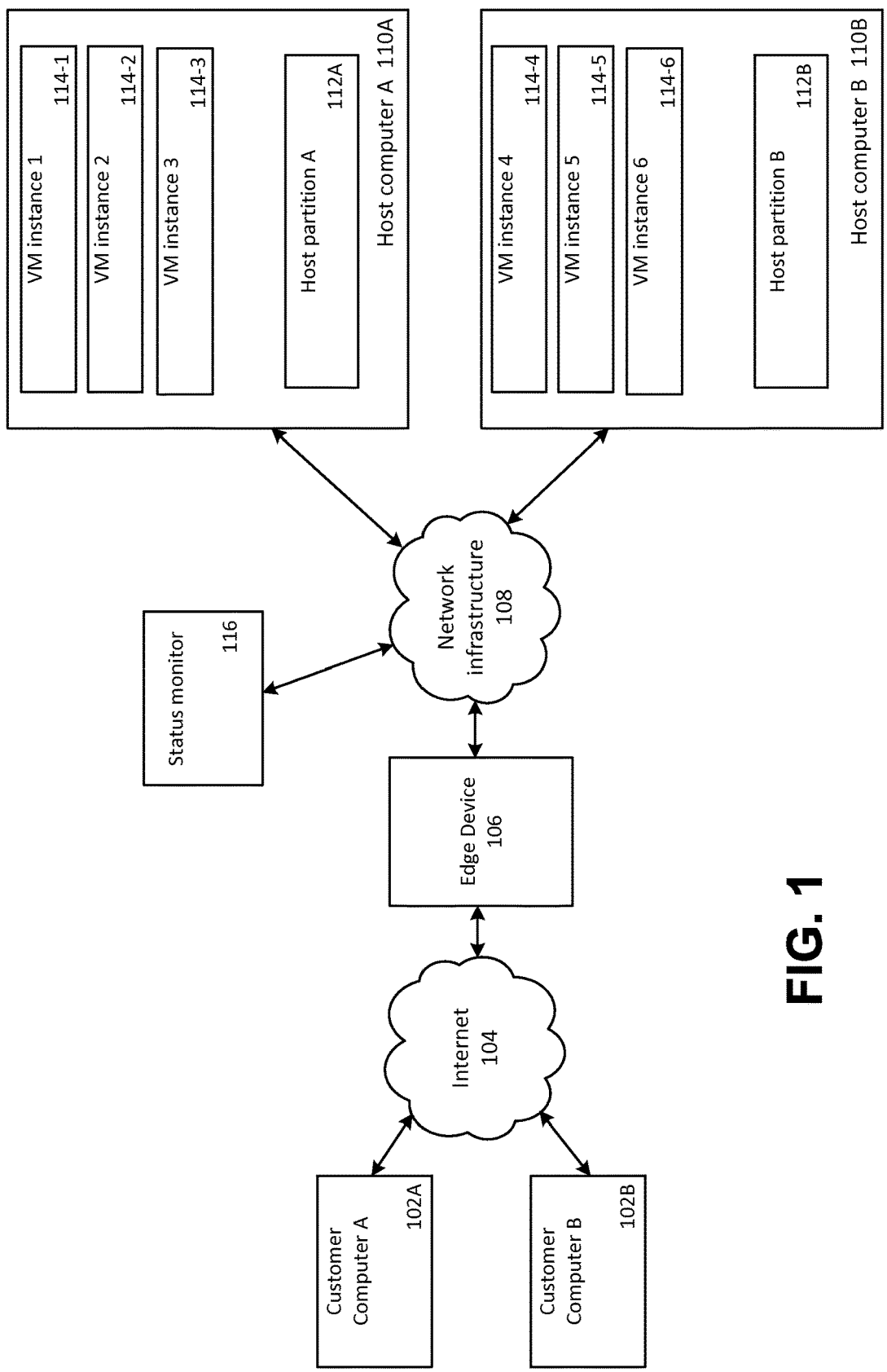
FIG. 1 depicts an example operating environment in which embodiments may be implemented.

It would be advantageous to provide a customer with information about the state of the computing nodes on the web services platform that are performing computing operations in response to a customer's instructions. The computing nodes may themselves host one or more virtual machine (VM) instances that are involved with performing these computing operations, and the computing nodes and/or the VM instances may become impaired while performing these computing operations. In embodiments, a computing node or VM instance may be considered to be impaired when it fails to meet a quantifiable metric, such as it is not responsive to a network ping within a certain amount of time, its memory usage is above a certain amount, or the time it takes to perform a known compute operation is above a certain amount.

Without an indication that a computing node or VM instance that is carrying out these computing operations has become impaired, a customer may not know whether the computing operations are merely taking a particularly long time or whether those computing operations will not complete because of an underlying problem with a computing node or VM instance.

Beyond indicating to a customer whether a computing node or VM instance is impaired or in a normal state, it may be advantageous to provide the customer with more detail about how a computing node or VM instance is impaired. For example, this additional detail may include an indication that a computing node has suffered a network connectivity issue, or a disk failure, or an indication that a VM instance is out of memory or has suffered a kernel panic. These issues may have different levels of significance. For example, a computing node network connectivity issue or a VM instance out-of-memory issue may be a temporary problem that may be resolved so that the computing operations may compute. However, a disk failure or a kernel panic may indicate that the computing operations assigned to that computing node or VM instance will not complete.

In determining these issues, there may be considerations in a web services platform (described in more detail with respect to FIG. 5) that are not present to a customer who directly controls its own computing nodes. Where a customer wants information about a computing node that it directly controls, an administrator may sit down at that computing node's console session, or remotely access that computing node (such as via a secure shell (SSH) session or a remote presentation session) and perform various diagnostics about the computing node's status (such as by running the "top" command on versions of the UNIX operating system). However, this may not be possible in embodiments of web services platforms where a customer can neither directly access nor remotely log into a computing node (or the VM instance on the computing node in which the customer's computing operations are carried out).

In such embodiments, a customer may be able to control starting and stopping VM instances but not be able to remotely log into these VM instances. A customer could overcome this by developing a software program that executes in the VM instance and provides information about the status of the VM instance to the customer, but this may be problematic because (1) developing this software program may be costly to the customer and (2) a process that executes in the VM instance may be unable to access information about the state of the computing node or information about the VM instance that is located outside of the VM instance (such as on the computing node on which the VM instance executes, or other devices of the web services platform, such as edge devices).

It may then be advantageous for a web services platform to implement functionality to inform a customer about the status of VM instances and computing nodes that are carrying out its computing operations. In embodiments, this functionality may include an agent as discussed above, but which is provided by the web services platform to the customer, so that the customer has no direct cost in developing it. This functionality may also include devices and/or processes that execute outside of a customer's VM instances, and these devices and/or processes may gather information about the VM instances that is not contained within the VM instances (e.g., information about a virtual machine manager (VMM) that supports the execution of the VM instances).

In embodiments, this information may be gathered and provided to the customer. In embodiments, the information may be gathered and analyzed for a possible solution to an impairment issue, and this solution may be implemented. In embodiments where a customer has multiple VM instances carrying out its computing operations, the status of these multiple VM instances may be collectively analyzed to determine commonalities (e.g., the customer's VM instances that function as a web server are more likely than other VM instances to have a particular type of impairment). In embodiments, multiple customers' VM instances may be collectively analyzed to determine similar commonalities.

The following will begin with an example operating environment in which determining the status of computing nodes and VM instances corresponding to a customer's computing operations in a web services platform may be determined. After that, example operating procedures that may be implemented in various portions of the web services platform to effectuate determining the status of computing nodes and VM instances corresponding to a customer's computing operations in a web services platform are described.

FIG. 1 depicts an example operating environment in which embodiments may be implemented. More detail about the operating environment, including more detail about individual components within the operating environment of FIG. 1 is given with respect to FIGS. 5-7. Generally, the operating environment of FIG. 1 includes a multi-customer web services platform that comprises multiple virtual machine instances executing on multiple host computers, with a status monitor that monitors the status of the instances and host computers.

Customer computer A 102A and customer computer B 102B are computers possessed by customers, which are configured to access the multi-customer web services platform via the Internet 104. In turn, the connection point between the multi-customer web services platform and Internet 104 is edge device 106. In embodiments, edge device 106 may be a gateway router. Within the multi-customer web services platform, edge device 106 connects to another computer network—network infrastructure 108. Network infrastructure 108 may be an intranet that is separate from Internet 104. Also connected to network infrastructure 108 are status monitor 116 and host computer X 110X and host computer B 110B.

Host computer A 110A and host computer B 110B are each configured to execute one or more virtual machine instances (respectively, VM instance 1 114-1, VM instance 2 114-2 and VM instance 3 114-3; and VM instance 4 114-4, VM instance 5 114-5 and VM instance 6 114-6), and a host partition (respectively, host partition A 112A and host partition B 112B. While each host computer 110 is depicted herein as hosting three VM instances, it may be appreciated that they may host more, or fewer, instances.

In embodiments, a customer directs the multi-customer web services platform to execute one or more VM instances on the customer's behalf. These VM instances may then execute to perform functions for the customer, such as a function of a web server for the customer's web site, or to perform compute functions, such as encoding video.

While these VM instances execute, a customer may issue queries to determine a status of one or more of its VM instances. Status monitor 116 (or other devices in the operating environment of FIG. 1) may gather information from one or more sources to determine the status. For instance, status monitor 116, when determining the status of VM instance 1 114-1, may use information gathered from edge device 106, host computer A 110A, host partition A 112A, and VM instance 1 114-1 itself. This information may comprise log files or other information indicative of status of the system, such as information from a process that monitors memory usage of VM instance 1 114-1.

This collected information may be gathered by status monitor 116, and used by status monitor 116 to determine the status of VM instance 1 114-1 (or another device in the operating environment of FIG. 1). Determining the status of a device in the operating environment of FIG. 1 is described in more detail with respect to the operating procedures of FIG. 2. Status monitor 116 may also determine the status of multiple customer devices, which is described in more detail with respect to the operating procedures of FIG. 3. Additionally, status monitor 116 may determine a possible solution to an impairment of a device, and possibly remedy the impaired device, which is described in more detail with respect to the operating procedures of FIG. 4.

Figure 2:
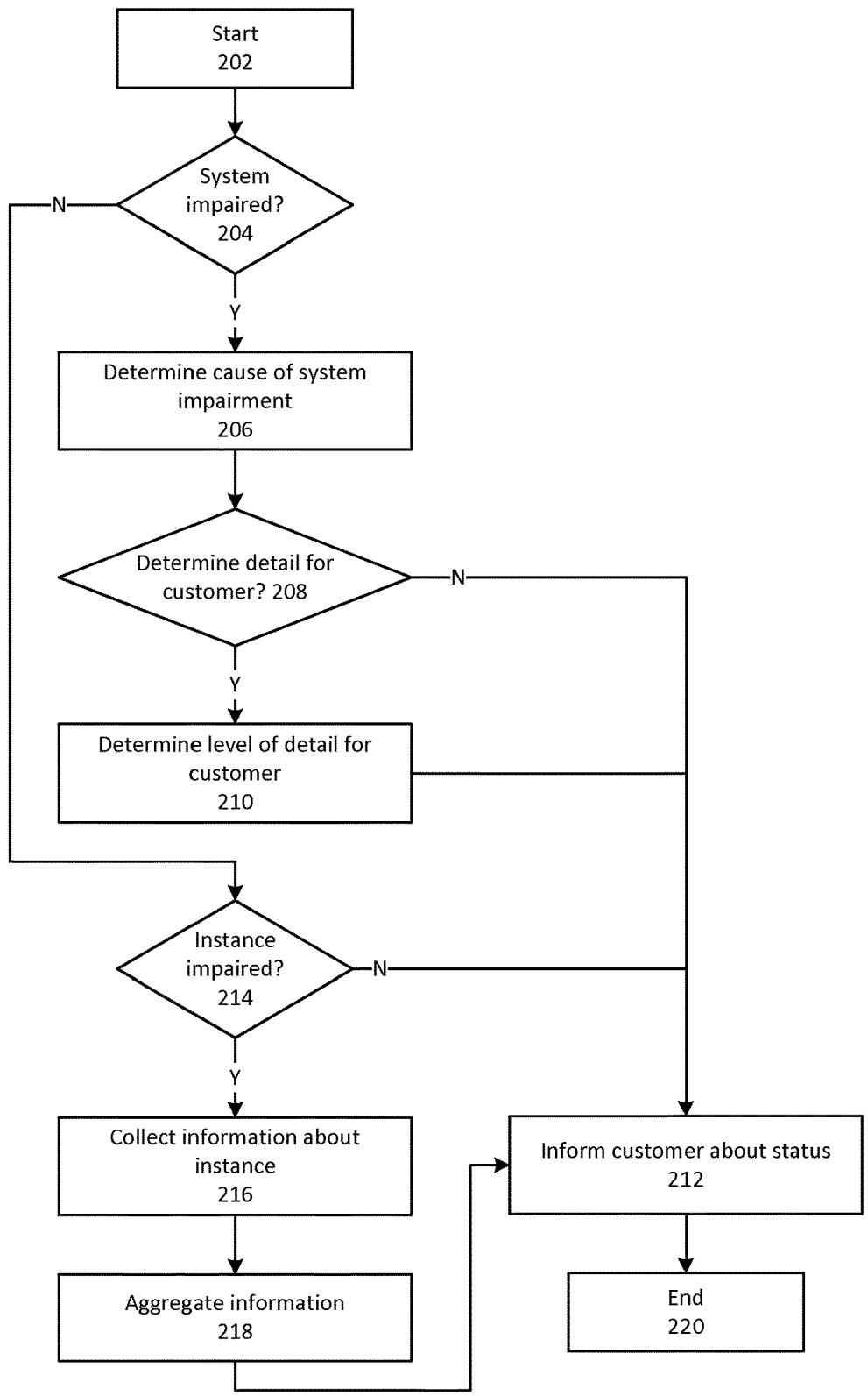
FIG. 2 depicts example operating procedures for determining the status of a system or of an instance.

FIG. 2 depicts example operating procedures for determining the status of a system or an instance. In embodiments, the operating procedures of FIG. 2 (and FIGS. 3-4) may be implemented on status monitor 116 of FIG. 1 to determine the status of a system such as host computer A 110A of FIG. 1, or the status of an instance, such as VM instance 1 114-1 of FIG. 1. In embodiments, the operating procedures depicted in FIG. 2 (or FIGS. 3-4) may be implemented in a different order than is depicted or may contain more or fewer operating procedures than are depicted. For example, there may be embodiments that never, or always, determine a level of detail regarding the cause of a system impairment to a customer, and in such embodiments it may be that operation 208 is not implemented. There may also be embodiments that implement operations 208-210 before operations 204-206.

The operating procedures of FIG. 2 begin with operation 202, and then move to operation 204. Operation 204 depicts determining whether a system is impaired. A system may be, for example, a physical computing node, such as host computer A 110A of FIG. 1. In embodiments, a computing node or VM instance may be considered to be impaired when it fails to meet a quantifiable metric, such as detecting hardware failures, network connectivity problems, kernel panics, as well as when an instance or host is not responsive to a network ping within a certain amount of time, the instance's memory usage is above a certain amount, or the time it takes the instance to perform a known compute operation is above a certain amount.

Where a system is impaired, it may not be responsive to network communications because it may not have power, it may not have a functioning network connection, or it may be powered on with a functioning network connection but have some other issue (e.g., a network partition, a disk failure, or a kernel panic in a host partition, such as host partition A 112A of FIG. 1). If it is determined that a system is not impaired—that the system is OK—then the operating procedures of FIG. 2 move to operation 214. If it is determined that a system is impaired, then the operating procedures of FIG. 2 move to operation 206.

Operation 206 depicts determining a cause of the system impairment. As described herein, a cause of impairment of a system or instance may also be referred to as a possible cause, or at least one possible cause. The cause may be referred to in this manner because certain types of impairment (e.g., memory usage about a predetermined level) may have a likely, or possible, cause (such as a certain process using a large amount of memory), but it may not be possible to determine the cause with absolute certainty.

Operation 206 may comprise the status monitor 116 performing a series of tests to determine the cause. For example, system monitor 116 may first determine whether the system has power, such as by attempting to access the system via a separate network from the network on which the system conducts network communications with a customer. Where the system is reachable via this separate network may indicate that the system has power. Then, system monitor 116 may ping the system on the network on which the system conducts network communications with a customer. Where the system is ping-able on this network may indicate that the system has network connectivity. Then the system monitor 116 may communicate with an agent resident on the system for information about the system, such as whether its disks are operational, its memory usage and its processor usage. Where one of these metrics is at a level considered abnormal (e.g., one process is consuming all of, or a significant portion of, memory), that may be an indication of the cause of the impairment. Another cause of system impairment may be attempts to write to a file system that is set to be read-only or that the system is temporarily non-responsive because it is running a disk check. It may be determined that the system itself is in normal condition, but a device between the system and the customer is impaired— such as an edge device, or a top-of-rack switch for a rack in which the system is physically located. Additionally, that impaired device may not be the root cause of system impairment—e.g., some process is taking up an unexpectedly large amount of memory, which is why the device is impaired. Continuing with the "process using a significant portion of memory" example, system monitor 116 may communicate with an agent resident on the system for further information, such as information about the processes executed by the system and the memory usage of each of these processes.

These tests may generally involve analyzing features of the virtual machine instance and the physical computing nodes of the multi-tenant web services platform that support the virtual machine instance (e.g., a physical host, or an edge router). These features may include things such as, whether a node or instance has power or network capability, a rate of network transfer to or from a node or instance, or a usage of memory or processing resources by a node or instance.

The possible cause of impairment may be determined from a set of predetermined, known possible causes. This set of possible causes may be determined in response to administrator input, e.g., an administrator may provide input to system monitor 116 that indicates that, when memory usage is above a certain level, a possible cause is a memory leak in a process, too many processes being executed, or a mistaken configuration that results in the system having less memory than was intended. After operation 206, the operating procedures of FIG. 2 move to operation 208.

Operation 208 depicts determining whether to modify the level of detail regarding the cause of the system impairment when reporting the impairment to a customer. In embodiments, it may be determined that the exact cause of the system impairment should not be reported to the customer. For example, such information may not be useful to the customer because the underlying architecture is abstracted from the customer and the customer does not have control over the underlying infrastructure. This determination of whether to modify the level of detail regarding the cause of the system impairment when reporting the impairment to a customer may be made, for example, in response to input from an administrator of the web services platform that is indicative of such, and that is stored by status monitor 116. Whether to modify the level of detail regarding the cause of the system impairment may be determined at the per-customer level, so for instance, a customer account associated with an administrator of the web services platform is able to receive a report that is not modified, while other customers receive reports that are modified.

Where it is determined not to modify the level of detail regarding the cause of the system impairment when reporting the impairment to a customer, the operating procedures of FIG. 2 move to operation 212. Where, instead, it is determined to modify the level of detail regarding the cause of the system impairment when reporting the impairment to a customer, the operating procedures of FIG. 2 move to operation 210.

Operation 210 depicts determining a level of detail regarding the cause of the system impairment. It may be that customer is given a low level of detail regarding the cause of the system impairment, and the customer is informed only that the system is impaired. In such an embodiment, operation 210 may comprise determining that there is a system impairment, and determining to inform the customer that the system is impaired without further detail. In other embodiments, some detail of the impairment may be given, but not full detail. For example, impairments may be generally grouped into those that may be resolved quickly and those that may take more time to resolve. In the case of a network failure, or an out-of-memory issue, this may possibly be resolved quickly, so an indication may be sent to the customer that there is a system impairment and the impairment is estimated to last a short amount of time. In the case of a disk failure or other hardware failure, it may be that this issue is not resolved quickly (because hardware may need to be manually replaced), so an indication may be sent to the customer that there is a system impairment and the impairment is estimated to last a longer amount of time. Similarly, a level of detail regarding the cause of a system failure may be given as being a "software failure" or a "hardware failure." After operation 210, the operating procedures of FIG. 2 move to operation 212.

Operation 214 depicts determining whether an instance is impaired and flows from operation 204 where it is determined that a system is not impaired. In other embodiments, it may be determined whether an instance is impaired regardless of whether a system is also impaired. Determining whether an instance is impaired may be performed on, for example, VM instance 1 114-1 of FIG. 1. System monitor 116 may perform tests similar to those performed above in determining whether a system is impaired. For example, system monitor 116 may attempt to ping the instance to determine whether it has network connectivity. Additionally, in a similar manner as to how system monitor 116 may determine the state of a system's memory usage and CPU usage, system monitor 116 may determine the state of an instance's memory usage and CPU usage. System monitor 116 may query an agent executing within the instance for information, and query the host partition that supports execution of the instance (such as host partition A 112A for VM instance 1 114-1) for information about the instance's status. Where it is determined that an instance is not impaired, the operating procedures of FIG. 2 move to operation 212. Where it is instead determined that an instance is impaired, the operating procedures of FIG. 2 move to operation 216.

Operation 216 depicts determining information about the impaired instance. This may comprise system monitor 116 querying a plurality of sources for information about the instance—e.g., querying host partition A 112A, querying VM instance 1 114-1, and edge device 106 (which may contain information about, e.g., network packets sent to and from VM instance 1 114-1 across Internet 104 that are not otherwise stored by host partition A 112A or VM instance 1 114-1). System monitor 116 may also query VM instance 1 114-1 for information about one or more processes running on VM instance 1 114-1 that stores data in log files on VM instance 1 114-1. System monitor 116 may then receive information to these queries, so that system monitor 116 has this information from multiple sources in one location. After operation 216, the operating procedures of FIG. 2 move to operation 218.

Operation 218 depicts aggregating the information about the impaired instance. Where there are multiple sources of information received in operation 216, this may comprise assembling this information from multiple sources into one form. For example, where there is a time stamp associated with each entry in multiple log files, this may comprise organizing the information from multiple log files into one log file based on the time stamp. After operation 218, the operating procedures of FIG. 2 move to operation 212.

In embodiments, operation 218 may comprise using this aggregated information to correlate the information with a possible cause of impairment. For instance, an administrator of a system in which the instance executes may set up a rules-based engine, or rules-based system in which, when given particular inputs, one or more possible causes of impairment (along with, in embodiments, an indication of how likely each possible cause of impairment is). For instance, the administrator may set this rules-based engine so that, where the inputs are an inability to communicate with the instance over the standard network (in which the instance communicates with customers) and an ability to communicate with the instance over a separate management network, a possible cause of impairment is to be output as a physical problem with the standard network. In another example, where the information input is that neither the instance nor its physical host responds to a network ping request, though other instances in a nearby physical location do respond to a network ping request, the administrator may set the rules-based engine to output the possible cause of impairment as an error with the instance itself, such as a kernel panic.

Operation 212 depicts informing the customer about the status. As depicted, operation 212 may be reached from several other operations: (1) from operation 208 where it is determined not to modify a level of detail regarding the cause of the system impairment when reporting the impairment to a customer; (2) from operation 210 where level of detail regarding the cause of the system impairment has been modified before reporting the impairment to a customer; (3) from operation 214 where neither a system nor an instance is impaired; or (4) from operation 218 where information about the cause of an instance impairment has been aggregated. This may comprise system monitor 116 storing an indication of the status of the system or instance in a memory, database, or storage, and providing the status to the customer via an interface, such as a programmatic web service API and/or a console. For example, a client can submit a web services request for instance status information. A web server can receive the request; route it to the system monitor 116; and the system monitor 116 can send the response back to the web server, which in turn can send a web service response to the client. In some embodiments, this may comprise sending the customer an email or other message that indicates the status of the system or instance. In embodiments, this may comprise including an indication of the nature of the impairment. For example, not all power outages may be created equal. In one case, a power outage may exist for a short amount of time because, for example, the power plant that supplies power to the instance is offline for a small amount of maintenance. In another case, a power outage may exist for a long amount of time because that power plant was destroyed in an earthquake. By including an indication that distinguishes between these two cases, a customer may be better informed about how long the impairment is expected to last, and whether the customer should take steps to account for those instances being impaired for some amount of time.

In the course of informing a customer of how long an impairment is expected to last, the amount of time that it takes to resolve certain types of impairments may be tracked and aggregated. This information may be aggregated according to a variety of statistical methods, such as simple mean or median, and possibly standard deviation along with one of those metrics. Then, the information of how long an impairment is expected to last may be provided to the customer in the form of an amount of time that similar impairments have lasted.

After operation 212, the operating procedures of FIG. 2 move to operation 220, where the operating procedures of FIG. 2 end.

Figure 3:
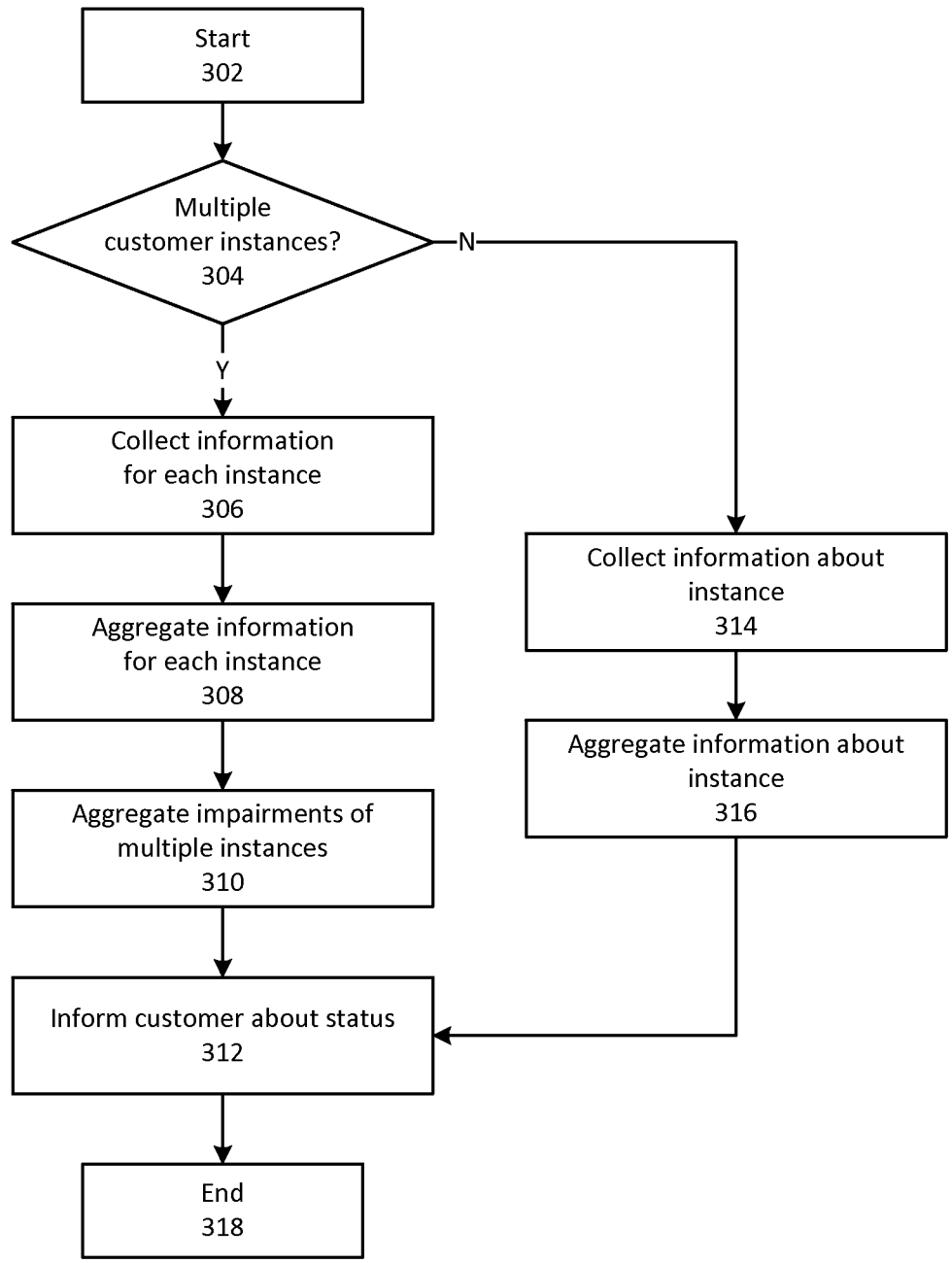
FIG. 3 depicts example operating procedures for aggregating a status among multiple customer instances.

FIG. 3 depicts example operating procedures for aggregating a status among multiple customer instances. Like the operating procedures of FIG. 2, the operating procedures of FIG. 3 may be implemented by system monitor 116 of FIG. 1. The operating procedures of FIG. 3 may be used where a customer has multiple instances or multiple systems (for example, the customer has arranged with the web services platform provider that the customer will be the only customer to execute instances on certain systems) which may have related causes of impairment. These operating procedures may be used to determine the related causes of impairment among multiple of the customer's instances or systems. In other embodiments, these operating procedures may be used to determine related causes of impairment among multiple customers' instance or systems. While the operating procedures below mainly discuss instances, similar techniques may be applied to systems. The operating procedures of FIG. 3 begin with operation 302, and then move to operation 304.

Operation 304 depicts determining whether there are multiple customer instances. This may comprise, for example, system monitor 116 of FIG. 1 querying an account for the customer to determine how many instances are currently associated with the account (the number of executing instances for an account may vary as the customer starts and stops instances). This information about the number of instances may be stored, for instance, by server computer 604 of FIG. 6 via management component 610 or deployment component 614. Where it is determined that there are not multiple customer instances, the operating procedures of FIG. 3 move to operation 314.

Operation 306 depicts collecting information for each instance. This operation may be performed in a similar fashion as operation 216 of FIG. 2. After operation 306, the operating procedures of FIG. 3 move to operation 308.

Operation 308 depicts aggregating information for each instance. This operation may be performed in a similar manner as operation 218 of FIG. 2. After operation 308, the operating procedures of FIG. 3 move to operation 310.

Operation 310 depicts aggregating the impairments of multiple instances. For instance, it may be determined that all of the impairments relate to the instances being out of memory, or that being out of memory is the most common cause of impairment. In other embodiments, aggregating the impairments of multiple instances may be done based on the type of the instances. For example, the instances may be grouped based on their operating system type, based on an amount of virtual memory they have or based on a function that they perform (e.g., running a database or functioning as a web server). Impairments of a certain type may be more common among instances of a certain type. For example, in the process of aggregating the impairments of multiple instances, it may be determined that instances running a certain operating system are more likely to have experienced kernel panic issues than other instances, and it may be determined that instances serving a database function are more likely to have out-of-memory issues than other instances. It may also be determined that impairments are related by physical location—e.g., impairments of a certain type are more common in a particular datacenter (or rack of physical hosts within a datacenter) than elsewhere within a web services platform. In this manner, the impairments of the multiple instances may be aggregated.

Time may also be a way in which instances are grouped. For example, multiple instances may be grouped around the same time. Aggregating impaired instances based on a time at which they became impaired, or at which it was determined that they were impaired may be used in determining a possible cause of impairment. For example, if several instances became impaired around a certain time, log files that contain information about those instances may be consulted at that time (and for a period before that time) to see whether there were commonalities that existed before the instances became impaired.

Figure 4:
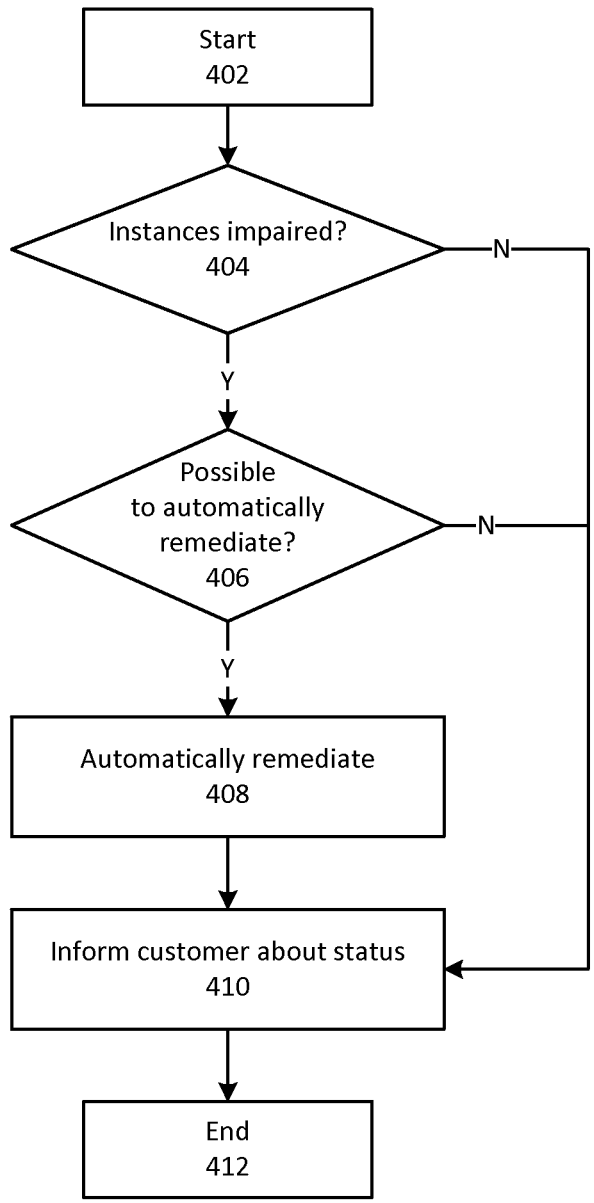
FIG. 4 depicts example operating procedures for remediating an impaired instance.

Additionally, aggregated information of the impairments of multiple instances may be used to determine remediation steps (such as described with respect to FIG. 4). For example, if 100,000 instances are impaired but operating at some diminished capacity, and a solution is to terminate and re-launch them, it may be preferable to do this in a staggered fashion, rather than terminating and re-launching all 100,000 instances concurrently. Similarly, where one physical host is to terminate and re-launch several instances, it may be faster for that host to perform these re-launches serially rather than in parallel. After operation 310, the operating procedures of FIG. 3 move to operation 312.

The act of aggregating the impairments of multiple instances may be used to further determine the cause of the impairment of these instances. For example, all instances on a particular rack of physical hosts may be impaired, which may be a signal that the cause of impairment may deal with the hardware of that rack of physical hosts (or network routing devices that connect to that rack of physical hosts).

Operation 312 depicts informing a customer about the status of its instance or instances. Operation 312 may be reached from operation 310 where there are multiple instances being analyzed, or from operation 316 where there is a single instance being analyzed. This operation may be implemented in a similar manner as operation 212 of FIG. 2. After operation 312, the operating procedures of FIG. 3 move to operation 318, where the operating procedures of FIG. 3 end.

Operation 314 depicts collecting information about the instance, and is reached from operation 304 where it is determined that there are not multiple customer instances. This operation may be implemented in a similar manner as operation 216 of FIG. 2. After operation 314, the operating procedures of FIG. 3 move to operation 316.

Operation 316 depicts aggregating the information collected about the instance. This operation may be implemented in a similar manner as operation 218 of FIG. 2. After operation 316, the operating procedures of FIG. 3 move to operation 312, which—as discussed above—depicts informing the customer about the status of the instance or instances, and then to operation 318, where the operating procedures of FIG. 3 end.

FIG. 4 depicts example operating procedures for remediating an impaired instance. Like the operating procedures of FIG. 2, the operating procedures of FIG. 3 may be implemented by system monitor 116 of FIG. 1. It may be that a web services platform can do more than merely inform a customer of a cause of an instance being impaired—a web services platform may be able to resolve the impairment without input from the customer. These operating procedures of FIG. 4 depict operations that may be used to do just that. The operating procedures of FIG. 4 may be implemented in concert with the operating procedures of FIGS. 2-3, so that they may be, for example, implemented to remediate multiple impaired instances as determined in the operating procedures of FIG. 3. While these operating procedures primarily deal with instances, it may be appreciated that similar techniques may be applied to systems. The operating procedures of FIG. 4 begin with operation 402, and then move to operation 404.

Operation 404 depicts determining whether an instance is impaired. This operation may be implemented in a similar manner as operation 214 of FIG. 2. Where it is determined that an instance is not impaired, the operating procedures of FIG. 4 move to operation 410. Where it is instead determined that an instance is impaired, the operating procedures of FIG. 4 move to operation 406.

Operation 406 depicts determining whether it is possible to automatically remediate the impairment for the instance. In embodiments, an administrator may have provided input to system monitor 116 in FIG. 1 that indicates various causes of impairment, whether they are to be automatically remediated, and if they are to be automatically remediated, how they are to be automatically remediated. For example, the remediation for an instance with a kernel panic may be to restart that instance on the same system. The remediation for an instance that is out of memory and running an agent that can modify the status of the instance and communicate with a remediation system may be to terminate a process in that instance that is consuming the most memory. Where the remediation involves terminating a process in a customer instance, this remediation may also involve remediating a policy from a user (such as via user input entered via a web page interface to a web services platform that supports the instance) that specifies whether terminating processes within that customer's instances are allowed. This policy may specify a subset of customer instances and/or processes that the customer allows terminating processes for. The remediation for an instance that has a physical network connectivity issue may be to migrate that instance to another system.

In embodiments, automatic remediation may be set at a per-customer level, with some customers electing not to have their instances automatically remediated. Automatic remediation may also be set at a per instance-type level, where some types of instances are automatically remediated and some types of instances are not automatically remediated.

Where it is determined that it is not possible to automatically remediate the impairment for the instance, the operating procedures of FIG. 4 move to operation 410. Where it is instead determined that it is possible to automatically remediate the impairment for the instance, the operating procedures of FIG. 4 move to operation 408.

Operation 408 depicts automatically remediating the impairment with the instance. This may comprise taking at least one action to remediate the cause of impairment (or the possible cause of impairment). Where it is determined that the impairment can be automatically remediated, the impairment is automatically remediated. For example, where it is determined by an administrator that a remediation for a kernel panic is to restart that instance on the same system, automatically remediating an instance with a kernel panic here may comprise restarting the instance on the system on which it currently executes. After operation 408, the operating procedures of FIG. 4 move to operation 410.

Operation 410 depicts informing a customer about the status of the instance. As depicted, operation 410 may be reached from several other operations: (1) from operation 404 where it is determined that an instance is not impaired; (2) from operation 406 where it is determined that it is not possible to automatically remediate the impairment for the instance; or (3) from operation 408 where the impairment for the instance is automatically remediated. This operation may be implemented in a similar manner as operation 212 of FIG. 2. Additionally, where the instance impairment was, or will be, remediated, the customer may be sent information about this status. For example, the customer may be sent an indication (1) that the instance was impaired by a particular cause, that it has already been remediated through a specified approach and that it was impaired for a particular amount of time; (2) that the instance is impaired by a particular cause that it is in the process of being remediated through a specified approach, or will be remediated in the future, that it has been impaired since a particular time, and that it is estimated that it will be remediated at a particular time; or (3) that the instance is impaired by a particular cause, and that it cannot or will not be remediated without further user input. After operation 410, the operating procedures of FIG. 4 move to operation 412, where the operating procedures of FIG. 4 end.

Figure 5:
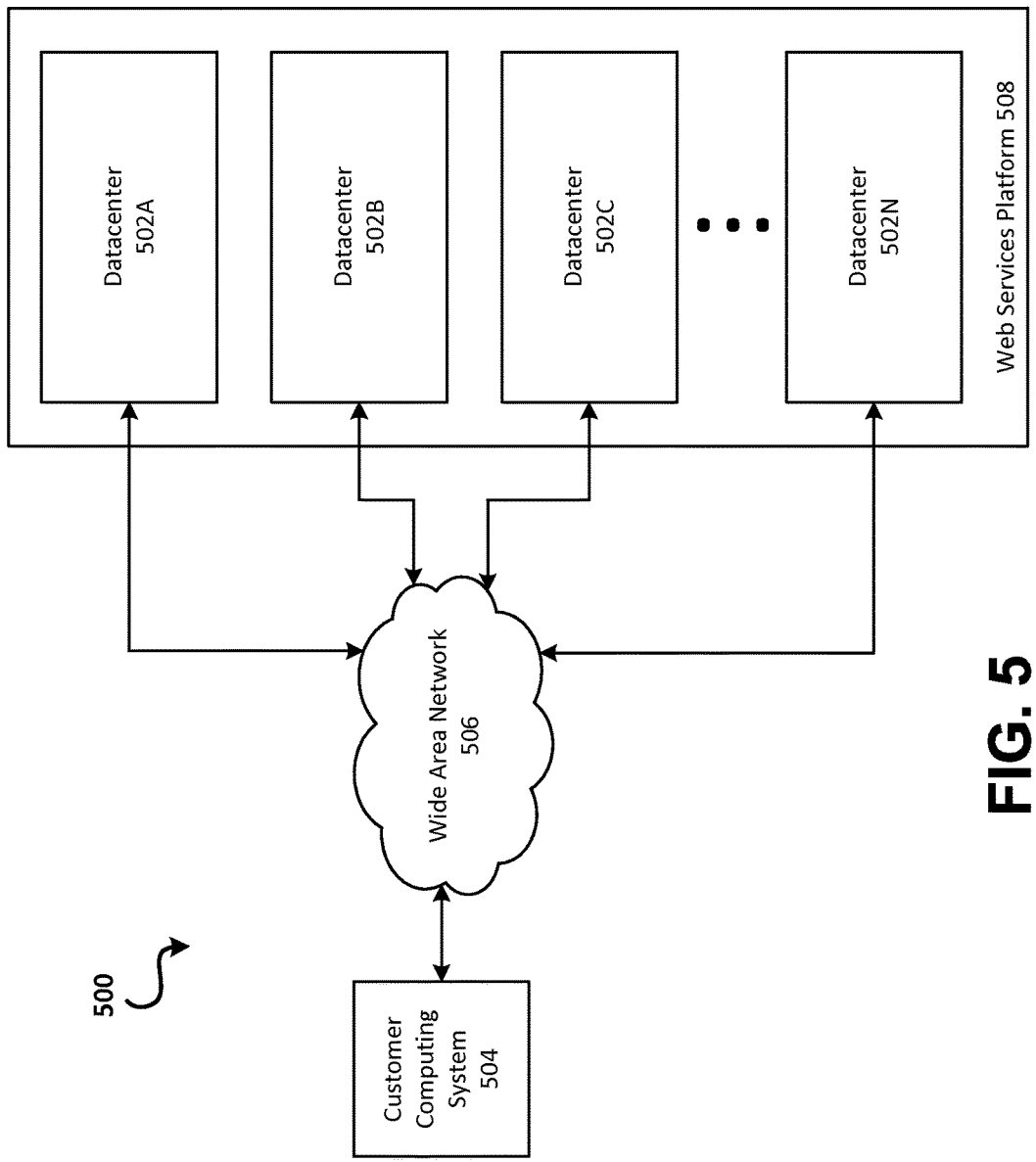
FIG. 5 depicts an example of a suitable computing environment in which embodiments described herein may be implemented.
Figure 6:
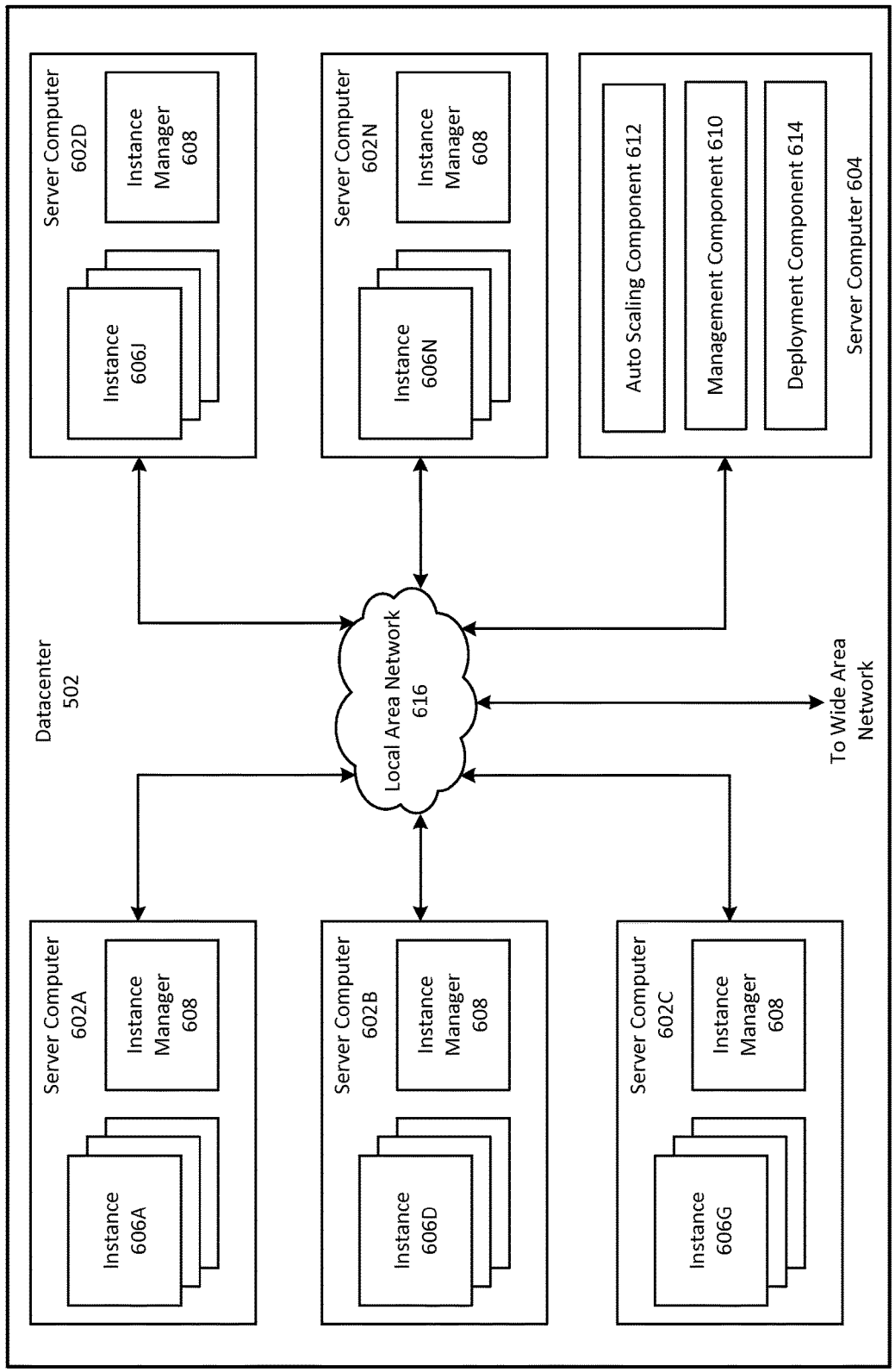
FIG. 6 depicts a computing system diagram that illustrates one configuration for datacenter 602 that implements web services platform 508.
Figure 7:
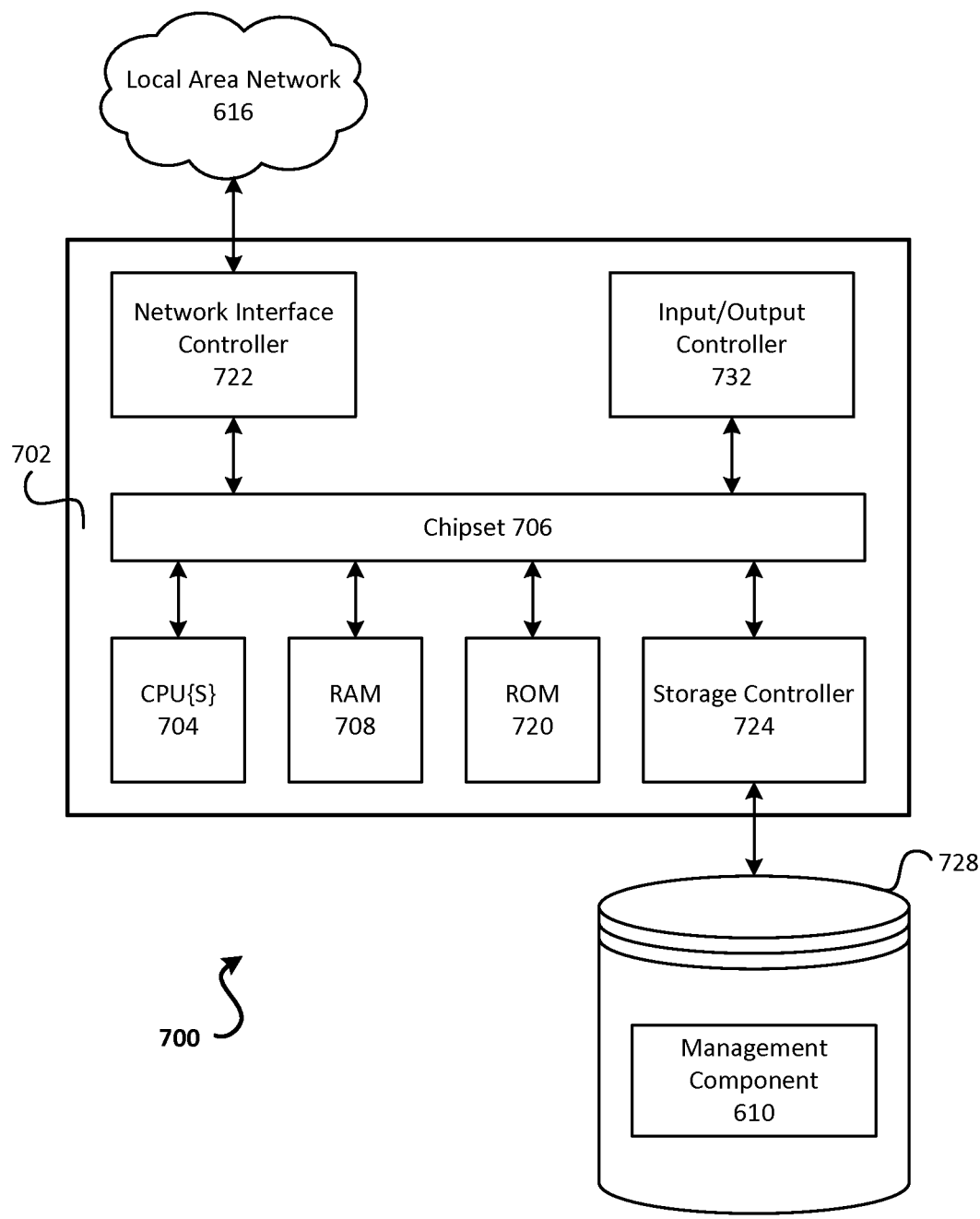
FIG. 7 depicts an example computer architecture for a computer 600 capable of executing the above-described software components.

FIGS. 5-7 are similar to FIG. 1 in that they depict example operating environments in which embodiments disclosed herein may be implemented, and these figures depict these operating environments at varying levels of granularity. FIG. 5 generally depicts a web services platform that comprises a plurality of datacenters. FIG. 6 generally depicts a datacenter that comprises a plurality of computers. FIG. 7 generally depicts a computer that may be part of a datacenter.

It may be appreciated that these operating environments of FIGS. 5-7 may be used to implement aspects of the operating environment of FIG. 1. For example, edge device 106, host computer A 110A, host computer B 110B, and status monitor 116 may be implemented in a datacenter 502 of FIG. 5, or across multiple datacenters 502 of FIG. 5. Likewise, Internet 104 of FIG. 1 may be wide area network 506 of FIG. 5, and customer computer-A 102A and customer computer-B 102B each may be customer computing system 504 of FIG. 5.

Turning now to details of FIG. 5, that figure depicts an example of a suitable computing environment in which embodiments described herein may be implemented. A cloud service provider (such as web services platform 508) may configure the illustrated computing environment to host virtual clouds of entities and to enable communication paths between these virtual clouds that may otherwise be isolated. In particular, FIG. 5 is a system and network diagram that shows an illustrative operating environment 500 that includes a web services platform 508, for implementing virtual clouds and for providing on-demand access to compute resources, such as virtual machine instances. Web services platform 508 can provide compute resources for executing applications on a permanent or an as-needed basis and may be configured as a private network. These compute resources may include various types of resources, such as data processing resources, data storage resources, data communication resources and the like. Each type of compute resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of compute resource may be available in different sizes, such as large resources consisting of many processors, large amounts of memory and/or large storage capacity and small resources consisting of fewer processors, smaller amounts of memory and/or smaller storage capacity. Entities may choose to allocate a number of small processing resources as Web servers and/or one large processing resource as a database server, for example.

The compute resources provided by web services platform 508 may be enabled by one or more datacenters 502A-502N, which may be referred herein singularly as "datacenter 502" or in the plural as "datacenters 502." Datacenters 502 may be facilities that house and operate computer systems and associated components and may include redundant and backup power, communications, cooling and security systems. Datacenters 502 may be located in a same geographical area, such as in a same facility, and may be interconnected using private networks, such as high-speed fiber optic networks, controlled and managed by a service provider of web services platform 508. Datacenters 502 may also be distributed across geographically disparate locations and may be interconnected in part using public networks, such as the Internet. One illustrative configuration for datacenter 502 that implements the concepts and technologies disclosed herein is described below with regard to FIG. 6.

Entities of web services platform 508 may access the compute resources provided by datacenters 502 over a wide-area network ("WAN") 506. Although a WAN is illustrated in FIG. 5, it should be appreciated that a local-area network ("LAN"), the Internet or any other networking topology known in the art that connects datacenters 502 to remote entities and other users may be utilized. It should also be appreciated that combinations of such networks may also be utilized.

An entity or other entities that are customers of web services platform 508 may utilize a computing system 504 to access the compute resources provided by datacenters 502. Customer computing system 504 comprises a computer capable of accessing web services platform 508, such as a server computer, a desktop or laptop personal computer, a tablet computer, a wireless telephone, a PDA, an e-reader, a game console, a set-top box or any other computing node.

As is described in greater detail below, customer computing system 504 may be utilized to configure aspects of the compute resources provided by web services platform 508. In this regard, web services platform 508 may provide a Web interface through which aspects of its operation may be configured through the use of a Web browser application program executing on customer computing system 504. Alternatively, a stand-alone application program executing on customer computing system 504 may access an application programming interface ("API") exposed by web services platform 508 for performing the configuration operations. Other mechanisms for configuring the operation of web services platform 508, including launching new virtual machine instances on web services platform 508, may also be utilized.

According to embodiments disclosed herein, capacities of purchased compute resources provided by web services platform 508 can be scaled in response to demand. In this regard, scaling refers to the process of instantiating, which may also be referred to herein as "launching" or "creating," or terminating, which may also be referred to herein as "de-scaling," instances of compute resources in response to demand.

Auto scaling may be one mechanism for scaling compute resources in response to increases or lulls in demand for the resources. Auto scaling may allow entities of web services platform 508 to scale their purchased compute resources according to conditions defined by the entity. For instance, rules may be defined for scaling up capacity in a particular manner in response to the occurrence of specified conditions, such as a spike in demand. Similarly, rules may also be defined to scale down capacity in a particular manner in response to the occurrence of other conditions, such as a lull in demand. The mechanisms disclosed herein for launching virtual machine instances may be utilized when instances are manually launched by an entity or when instances are launched by an auto scaling component in web services platform 508.

Web services platform 508 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared and other types of information. The deployment component utilizes the entity-provided configuration and cache warming logic to launch, configure and prime new instances of compute resources.

FIG. 6 depicts a computing system diagram that illustrates one configuration for datacenter 502 that implements web services platform 508. With regards to elements of the web services platform previously described with respect to FIG. 1, host computer A 110A and host computer B 110B may each be a server computer 602 of FIG. 6 (which itself may be computer 700 of FIG. 7), host partition A 112A and host partition B 112B may each be an instance of instance manager 608 (where a host partition serves a hypervisor-type role), and VM instances 114 may each be an instance 606 of FIG. 6. Network infrastructure 108 of FIG. 1 may be local area network 616 of FIG. 6, and status monitor 116 of FIG. 1 may be server computer 604 of FIG. 6.

The example datacenter 502 shown in FIG. 6 may include several server computers 602A-602N, which may be referred herein singularly as "server computer 602" or in the plural as "server computers 602," for providing compute resources for hosting virtual clouds and for executing applications. Server computers 602 may be standard tower or rack-mount server computers configured appropriately for providing the compute resources described above. For instance, in one implementation server computers 602 may be configured to provide instances 606A-606N of compute resources.

Instances 606A-606N, which may be referred herein singularly as "instance 606" or in the plural as "instances 606," may be virtual machine instances. As known in the art, a virtual machine instance is an instance of a software implementation of a machine (i.e., a computer) that executes programs like a physical machine. In the example of virtual machine instances, each server 602 may be configured to execute an instance manager 608 capable of executing the instances. Instance manager 608 may be a hypervisor or another type of program configured to enable the execution of multiple instances 606 on a single server 602, for example. As discussed above, each of instances 606 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources and with other types of resources. The embodiments disclosed herein may also execute all or a portion of an application directly on a computer system without utilizing virtual machine instances.

Datacenter 502 shown in FIG. 6 may also include a server computer 604 reserved for executing software components for managing the operation of datacenter 502, server computers 602 and instances 606. In particular, server computer 604 may execute a management component 610. As discussed above, working between FIG. 5. and FIG. 6, an entity of web services platform 508 may utilize customer computing system 504 to access management component 610 to configure various aspects of the operation of web services platform 508 and instances 606 purchased by the entity. For example, the entity may purchase instances and make changes to the configuration of the instances. The entity may also specify settings regarding how the purchased instances are to be scaled in response to demand. The entity may also provide requests to launch instances to management component 610.

As also described briefly above, an auto scaling component 612 may scale instances 606 based upon rules defined by an entity of web services platform 508. For example, auto scaling component 612 may allow an entity to specify scale up rules for use in determining when new instances should be instantiated and scale down rules for use in determining when existing instances should be terminated.

Auto scaling component 612 may execute on a single server computer 604 or in parallel across multiple server computers 602 in web services platform 508. In addition, auto scaling component 612 may consist of a number of subcomponents executing on different server computers 602 or other computing nodes in web services platform 508. Auto scaling component 612 may be implemented as software, hardware or any combination of the two. Auto scaling component 612 may monitor available compute resources in web services platform 508 over an internal management network, for example.

As discussed briefly above, datacenter 502 may also be configured with a deployment component 614 to assist entities in the deployment of new instances 606 of compute resources. Deployment component 614 may receive a configuration from an entity that includes data describing how new instances 606 should be configured. For example, the configuration may specify one or more applications that should be installed in new instances 606, provide scripts and/or other types of code to be executed for configuring new instances 606, provide cache warming logic specifying how an application cache should be prepared and other types of information.

Deployment component 614 may utilize the entity-provided configuration and cache warming logic to configure, prime and launch new instances 606. The configuration, cache warming logic and other information may be specified by an entity using management component 610 or by providing this information directly to deployment component 614. Other mechanisms may also be utilized to configure the operation of deployment component 614.

In the example datacenter 502 shown in FIG. 6, an appropriate LAN (local area network) 616 may be utilized to interconnect server computers 602A-602N and server computer 604. LAN 616 may also be connected to WAN 506 illustrated in FIG. 5. It should be appreciated that the network topology illustrated in FIGS. 5 and 6 has been greatly simplified and that many more networks and networking devices may be utilized to interconnect the various computing systems disclosed herein. Appropriate load balancing devices or software modules may also be utilized for balancing a load between each of datacenters 502A-502N, between each of server computers 602A-602N in each datacenter 502 and between instances 606 purchased by each entity of web services platform 508. These network topologies and devices should be apparent to those skilled in the art.

It should be appreciated that datacenter 502 described in FIG. 6 is merely illustrative and that other implementations may be utilized. In particular, functionality described herein as being performed by management component 610, auto scaling component 612 and deployment component 614 may be performed by one another, may be performed by other components or may be performed by a combination of these or other components. Additionally, it should be appreciated that this functionality may be implemented in software, hardware or a combination of software and hardware. Other implementations should be apparent to those skilled in the art.

FIG. 7 depicts an example computer architecture for a computer 700 capable of executing the above-described software components. With regard to the example web services platform described with respect to FIG. 1, host computer A 110A, host computer B 110B, and status monitor 116, as well as customer computer-A 102A, and customer computer-B 102B may each be implemented in computer 700 of FIG. 7.

The computer architecture shown in FIG. 7 illustrates a conventional server computer, workstation, desktop computer, laptop, tablet, network appliance, PDA, e-reader, digital cellular phone or other computing node, and may be utilized to execute any aspects of the software components presented herein described as executing within datacenters 502A-702N, on server computers 602A-602N, on the customer computing system 504 or on any other computing system mentioned herein.

Computer 700 may include a baseboard, or "motherboard," which is a printed circuit board to which a multitude of components or devices may be connected by way of a system bus or other electrical communication paths. One or more central processing units ("CPUs") 704 may operate in conjunction with a chipset 706. CPUs 704 may be standard programmable processors that perform arithmetic and logical operations necessary for the operation of computer 700.

CPUs 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

Chipset 706 may provide an interface between CPUs 704 and the remainder of the components and devices on the baseboard. Chipset 706 may provide an interface to a random access memory ("RAM") 708 used as the main memory in computer 700. Chipset 706 may further provide an interface to a computer-readable storage medium such as a read-only memory ("ROM") 720 or non-volatile RAM ("NVRAM") for storing basic routines that may help to start up computer 700 and to transfer information between the various components and devices. ROM 720 or NVRAM may also store other software components necessary for the operation of computer 700 in accordance with the embodiments described herein.

Computer 700 may operate in a networked environment using logical connections to remote computing nodes and computer systems through network 616. Chipset 706 may include functionality for providing network connectivity through a network interface controller ("NIC") 722, such as a gigabit Ethernet adapter. NIC 722 may be capable of connecting the computer 700 to other computing nodes over network 616. It should be appreciated that multiple NICs 722 may be present in computer 700, connecting the computer to other types of networks and remote computer systems.

Computer 700 may be connected to a mass storage device 728 that provides non-volatile storage for the computer. Mass storage device 728 may store system programs, application programs, other program modules and data which have been described in greater detail herein. Mass storage device 728 may be connected to computer 700 through a storage controller 724 connected to chipset 706. Mass storage device 728 may consist of one or more physical storage units. Storage controller 724 may interface with the physical storage units through a serial attached SCSI ("SAS") interface, a serial advanced technology attachment ("SATA") interface, a fiber channel ("FC") interface or other type of interface for physically connecting and transferring data between computers and physical storage units.

Computer 700 may store data on mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 728 is characterized as primary or secondary storage and the like.

For example, computer 700 may store information to mass storage device 728 by issuing instructions through storage controller 724 to alter the magnetic characteristics of a particular location within a magnetic disk drive unit, the reflective or refractive characteristics of a particular location in an optical storage unit or the electrical characteristics of a particular capacitor, transistor or other discrete component in a solid-state storage unit. Other transformations of physical media are possible without departing from the scope and spirit of the present description, with the foregoing examples provided only to facilitate this description. Computer 700 may further read information from mass storage device 728 by detecting the physical states or characteristics of one or more particular locations within the physical storage units.

In addition to mass storage device 728 described above, computer 700 may have access to other computer-readable storage media to store and retrieve information, such as program modules, data structures or other data. It should be appreciated by those skilled in the art that computer-readable storage media can be any available media that provides for the storage of non-transitory data and that may be accessed by computer 700.

By way of example and not limitation, computer-readable storage media may include volatile and non-volatile, transitory and non-transitory, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage, other magnetic storage devices or any other medium that can be used to store the desired information in a non-transitory fashion.

Mass storage device 728 may store an operating system utilized to control the operation of the computer 700. According to one embodiment, the operating system comprises a version of the LINUX operating system. According to another embodiment, the operating system comprises a version of the WINDOWS® SERVER operating system from the MICROSOFT Corporation. According to further embodiments, the operating system may comprise a version of the UNIX operating system. It should be appreciated that other operating systems may also be utilized. Mass storage device 728 may store other system or application programs and data utilized by computer 700, such as management component 610 and/or the other software components described above.

Mass storage device 728 or other computer-readable storage media may also be encoded with computer-executable instructions, which, when loaded into computer 700, transforms the computer from a general-purpose computing system into a special-purpose computer capable of implementing the embodiments described herein. These computer-executable instructions transform computer 700 by specifying how CPUs 704 transition between states, as described above. Computer 700 may have access to computer-readable storage media storing computer-executable instructions, which, when executed by computer 700, may perform operating procedures depicted in FIGS. 2-4.

Computer 700 may also include an input/output controller 732 for receiving and processing input from a number of input devices, such as a keyboard, a mouse, a touchpad, a touch screen, an electronic stylus or other type of input device. Similarly, input/output controller 732 may provide output to a display, such as a computer monitor, a flat-panel display, a digital projector, a printer, a plotter or other type of output device. It will be appreciated that computer 700 may not include all of the components shown in FIG. 7, may include other components that are not explicitly shown in FIG. 7 or may utilize an architecture completely different than that shown in FIG. 7.

As described herein, a computing node may be a physical computing node, such as computer 700 of FIG. 7. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware or a combination of software and hardware. Other implementations should be apparent to those skilled in the art. It should also be appreciated that a server, gateway or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method, comprising:
    determining that a first virtual machine (VM) instance of a plurality of virtual machine instances of a multi-tenant compute service is in an impaired condition while the first VM instance is performing computing operations responsive to customer instructions of a customer associated with the first VM instance;
    receiving, by at a computing node and from a physical computing node of the multitenant compute service, information about a status of the first VM instance, wherein the information about the status of the first VM instance that includes information about resources external to the computing device executing the first VM instance, and wherein the physical computing node supports the first VM instance and is inaccessible to the customer associated with the first VM instance;
    determining, by the computing node, a possible cause for the first VM instance to be in the impaired condition from a set of known possible causes based in part on the information about the resources external to the computing device executing the first VM instance; and
    sending the customer associated with the first VM instance an indication of the possible cause of the first VM instance being impaired, wherein a level of detail about the impaired condition provided, automatically by the indication, is based at least in part on a level of detail parameter associated with an account type of the customer, wherein a first parameter type indicates generalized information comprising a generalization of a nature of the impaired condition based on the possible cause of the impaired condition and a second parameter type indicates an increased level of detail about the possible cause of the impaired condition.

2. The method of claim 1, further comprising:
    receiving second information about the status of the first virtual machine instance from the first virtual machine instance; and
    wherein determining the possible cause comprises determining the possible cause based at least in part on the information about the status of the first virtual machine instance and the second information about the status of the first virtual machine instance.

3. A system, comprising:
    a memory bearing instructions that, upon execution by a processor, cause the system at least to:
    determine that a first virtual machine (VM) instance is in an impaired condition while the first VM instance is performing computing operations responsive to customer instructions, the VM instance running on a compute node on a first network, the first network associated with a web services interface that interfaces the first network with a second network;
    receive, from a physical computing node of the system that supports the first VM instance, information about a status of the first VM instance, wherein the information about the status of the first VM instance includes information about resources outside of the first VM instance and wherein the physical computing node is inaccessible to the customer associated with the first VM instance;
    determine at least one possible cause for the impaired condition from a set of known possible causes based at least in part on the information about resources outside of the VM instance; and
    provide information based at least in part on the at least one possible cause via the web services interface, wherein a level of detail about the impaired condition provided, automatically by the provided information, is based at least in part on a level of detail parameter associated with an account type of the customer, wherein a first parameter type indicates generalized information comprising a generalization of a nature of the impaired condition based on the possible cause of the impaired condition and a second parameter type indicates an increased level of detail about the possible cause of the impaired condition.

4. The system of claim 3, wherein the memory further bears instructions that, upon execution by the processor, cause the system at least to:
apply at least one action to remediate the impaired condition.

5. The system of claim 4, wherein the instructions that, upon execution by the processor, cause the system at least to apply the at least one action further cause the system at least to:
cause a process executed by the first VM instance to be terminated in accordance with a policy provided by a user account associated with the first VM instance.

6. The system of claim 5, wherein the instructions that, upon execution by the processor, cause the system at least to apply the at least one action to remediate the impaired condition further cause the system at least to:
cause the first VM instance to be restarted.

7. The system of claim 6, wherein the instructions that, upon execution by the processor, cause the first VM instance to be restarted further cause the system at least to:
determine a second physical computing node on which to execute the first VM.

8. The system of claim 6, wherein the instructions that, upon execution by the processor, cause the first VM instance to be restarted further cause the system at least to:
cause the first VM instance to be restarted in response to determining that an operating system executing within the first VM instance is out of virtual memory.

9. The system of claim 4, wherein the memory further bears instructions that, upon execution by the processor, cause the system at least to:
provide information that the first VM instance was remediated via the web services interface.

10. The system of claim 3, wherein the instructions that, upon execution by the processor, cause the system at least to determine the at least one possible cause for the impaired condition further cause the system at least to:
determine the at least one possible cause for the impaired condition based on applying the information about the status of the first VM instance to a rules-based engine that correlates information about VM instances with possible causes for the impaired condition.

11. The system of claim 3, wherein the instructions that, upon execution by the processor, cause the system at least to determine the at least one possible cause for the impaired condition further cause the system at least to:
determine that the physical computing node is impaired.

12. The system of claim 11, wherein determining that the computing node upon which the first VM instance executes is impaired further cause the system at least to:
determine that the physical computing node has lost power.

13. The system of claim 11, wherein the instructions that, upon execution by the processor, cause the system at least to determine that the computing node upon which the first VM instance executes is impaired further cause the system at least to:
determine that the computing node upon which the first VM instance executes is unreachable via a network interface connecting the computing node to the second network.

14. The system of claim 3, wherein the instructions that, upon execution by the processor, cause the system at least to determine the at least one possible cause for the impaired condition further cause the system at least to:
determine that the physical computing node is impaired;
determine the level of detail for the at least one possible cause of impairment of the physical computing node is to be modified; and
wherein the instructions that, upon execution by the processor, cause the system at least to provide information based at least in part on the at least one possible cause via the web services interface further cause the system at least to generalize the information based at least in part on the at least one possible cause via the web services interface, the generalized information comprising a generalization of the at least one possible cause for the impairment.

15. The system of claim 3, wherein the instructions that, upon execution by the processor, cause the system at least to determine the at least one possible cause far the impaired condition further cause the system at least to:
determine that the computing node is impaired; and
wherein the instructions that, upon execution by the processor, cause the system at least to provide information based at least in part on the possible cause via the web services interface further cause the system at least to provide information based at least in part on the possible cause via the web services interface in response determining that the level of detail for the possible cause is not to be modified, the information based at least in part on the possible cause identifying the at least one possible cause without modifying the at least one possible cause.

16. A non-transitory computer-readable storage medium, computer-readable instructions that, when executed on a computing node, cause the computing node to perform operations comprising:
determining that a first virtual machine (VM) instance of a plurality of VM instances is in an impaired condition while the first VM instance is performing computing operations responsive to customer instructions of a customer associated with the first VM instance;
receiving, from a physical computing node that supports the first VM instance, information about a status of the first VM instance, wherein the information about the status of the first VM instance includes information about resources outside of the first VM instance, the physical computing node being inaccessible by the customer associated with the first VM instance;
determining at least one possible cause for the impaired condition from a set of known possible causes of the first VM instance being in the impaired condition based at least in part on the information about resources outside of the VM instance; and
storing an indication of the at least one possible cause of the first VM instance being in the impaired condition in a memory, wherein a level of detail about the impaired condition provided, automatically by the indication, is based at least in part on a level of detail parameter associated with an account type of the customer, wherein a first parameter type indicates generalized information comprising a generalization of a nature of the impaired condition based on the possible cause of the impaired condition and a second parameter type indicates an increased level of detail about the possible cause of the impaired condition.

17. The computer-readable storage medium of claim 16, further bearing computing node-executable instructions that, when executed on the computing node, cause the computing node to perform operations comprising:
- determining that a second VM instance of the plurality of instances is in a second impaired condition;
- determining at least one possible cause of the second VM instance being in the second impaired condition; and
- determining at least one common possible cause of impairment among the first VM instance and the second VM instance based at least in part on the at least one possible cause of the first VM instance being in the impaired condition and the at least one possible cause of the second VM instance being in the second impaired condition.

18. The computer-readable storage medium of claim 17, wherein determining the at least one common possible cause of impairment among the first VM instance and the second VM instance comprises:
- determining that first VM instance and the second VM instance share a VM type.

19. The computer-readable storage medium of claim 17, wherein determining the at least one common possible cause of impairment among first VM instance and the second VM instance comprises:
- determining that first VM instance and the second VM instance execute a same operating system version.

20. The computer-readable storage medium of claim 17, wherein determining the at least one common possible cause of impairment among the first VM instance and the second VM instance comprises:
- determining that the first VM instance and the second VM instance execute a same application.

21. The computer-readable storage medium of claim 17, wherein determining the at least one common possible cause of impairment comprises:
- determining that the at least one common possible cause of impairment is a hardware issue based at least in part on first VM instance and the second VM instance sharing a rack in a datacenter.

22. The computer-readable storage medium of claim 16, wherein storing the indication of the at least one possible cause of the first VM instance being in the impaired condition in the memory comprises: storing an indication of an estimated amount of time for how long the first VM instance will be in the impaired condition in the memory.

* * * * *